United States Patent [19]

Speer et al.

[11] Patent Number: 5,252,126
[45] Date of Patent: Oct. 12, 1993

[54] NEUTRAL BLUE ZIRCONIUM-VANADIUM PIGMENTS

[75] Inventors: Dietrich Speer; Akos Kiss; Jenny Horst, all of Hanau, Fed. Rep. of Germany

[73] Assignee: Degussa Aktiengesellschaft, Frankfurt, Fed. Rep. of Germany

[21] Appl. No.: 59,581

[22] Filed: May 12, 1993

[30] Foreign Application Priority Data

May 15, 1992 [DE] Fed. Rep. of Germany ....... 4216174

[51] Int. Cl.$^5$ ............................................. C08K 3/00
[52] U.S. Cl. ..................................... 106/451; 106/450
[58] Field of Search ............................... 106/450, 451

[56] References Cited

U.S. PATENT DOCUMENTS 3,025,178  3/1962  Seabright ............................ 106/451
3,058,838 10/1962  Olby .................................... 106/451

FOREIGN PATENT DOCUMENTS 1121814 7/1968 United Kingdom .
1177001 1/1970 United Kingdom .

Primary Examiner—Karl Group
Assistant Examiner—Chris Gallo
Attorney, Agent, or Firm—Beveridge, DeGrandi, Weilacher & Young

[57] ABSTRACT

Disclosed are neutral blue zirconium-vanadium pigments which do not display the disadvantages of previously known generic pigments, namely the high green component and the low color intensity and insufficient reproducibility in the case of neutral blue pigments. The neutral blue pigments with a rather high color intensity and good reproducibility are doped in the host lattice with phosphorus in addition to vanadium and are characterized by their color values in the CIE $L^*a^*b^*$ system. In order to produce such pigments, a zirconium-free mixture of powdery $ZrO_2$, an $SiO_2$ source, a vanadium compound and a phosphorus compound with an atomic ratio of Zr:Si:V:P=1:(0.95–1.10):(0.05–0.20):(0.005–0.03) as well as of a fluoride mineralizer is annealed after intensive grinding at 700° to 900° C.

28 Claims, No Drawings

NEUTRAL BLUE ZIRCONIUM-VANADIUM PIGMENTS

BACKGROUND AND INTRODUCTION

The present invention relates to neutral blue zirconium-vanadium pigments which are distinguished over generic previously known pigments by distinctly improved color values in the CIE-L*a*b* color system. Further subject matter of the present invention relates to a method of producing such neutral blue zirconium-vanadium pigments.

Glaze-stable coloring pigments based on zirconium silicate doped with vanadium have long been known (U.S. Pat. No. 2,441,447). Such coloring substances, frequently designated as zirconium-vanadium blue, are produced by means of annealing a mixture of zirconium compounds, silicon compounds, and vanadium compounds which are capable of forming $ZrO_2$, $SiO_2$ and $V_2O_5$. The powder mixture, which is to be annealed at 650° to 1200° C., generally contains one or several mineralizers from the series of alkali metal oxides, hydroxides, carbonates and fluorides. The color values, measured in the CIE-L*a*b* color system according to DIN 5033 (see part 3, 01/80) using a 5% by weight staining or dyeing in a transparent glaze are in the range of $L^*=37$ to 45, $a^*=-5$ to $-12$ and $b^*=-25$ to $-35$ for pigments produced under very favorable conditions. Even if the literature discusses only zirconium-vanadium blue, it should not be overlooked that this concerns a Turkey blue coloring substance (i.e., one with a relatively large green component characterized by the strongly negative a* value). A neutral blue which is characterized by an a* value about 0, a b* value more negative than −20 and an L* value of less than 50 was not able to be obtained within the framework of the disclosure of U.S. Pat. No. 2,441,447, even with variation of the production conditions. There is great interest in so-called corner coloring substances, in this case a neutral blue pigment with an a* value near 0, because such coloring substances are well suited for the production of pigment mixtures for the purposeful adjustment of quite specific color locations and can thus replace cobalt-containing coloring substances as required.

GB 1,447,276 teaches greenish-blue to bluish-violet or grayish-violet coloring substances based on zirconium silicate doped with vanadium. The color shift of the known greenish-blue to a more reddish tone is obtained in the method described in this document in that the mixture to be annealed additionally contains a small amount of an inorganic phosphate or of an organic phosphoric acid ester. Thermally dissociated zirconium silicate is used as the exclusive source for $ZrO_2$ and $SiO_2$. It was determined that the neutral blue or slightly reddishly tinged blue coloring substances obtained according to this method also contain phosphorus in addition to vanadium in the zirconium silicate host lattice. The neutral blue, i.e., phosphorus-containing zirconium-vanadium pigments produced according to GB 1,447,276, are characterized by a low color intensity (L* value around or above 60) and an insufficient color saturation which is brought about in particular by low b* values from −5 to −19.

A further disadvantage of the neutral blue pigments produced according to the method of GB 1,447,276 is the fact that they can not be produced in reproducible quality (i.e., with low color intervals measured according to the CIELAB formula in accordance with DIN 6174 (Jan. 1979)). This disadvantage is surprising at first because especially favorable prerequisites for the formation of host lattice pigments were expected from thermally dissociated zirconium silicate since an especially intimate mixture of the two components $SiO_2$ and $ZrO_2$ is present in this instance. One of the causes for this disadvantage is suspected in the optionally changing content of non-dissociated zirconium silicate in the thermally dissociated zirconium silicate. The new formation of $ZrSiO_4$ from $SiO_2$ and $ZrO_2$ is obviously seeded by thermally non-dissociated zirconium silicate so that the required doping with vanadium and phosphorus remains insufficient, which brings about a diminution of the color intensity.

SUMMARY OF THE INVENTION

An object of the present invention is to provide neutral blue zirconium-vanadium pigments which are not only neutral blue (i.e., exhibit an a* value around 0), but at the same time are characterized in comparison to previously known pigments by a greater color intensity (lower L* value) and a greater color saturation (especially due to a greater negative b* value). The color saturation component of a color location is given by the formula $C_{ab}^*=(a^{*2}+b^{*2})^{\frac{1}{2}}$.

Another object of the present invention involves a method for the production of the neutral blue pigments. The method should be reliably reproducible, i.e., the color interval determined according to the CIELAB formula (DIN 6174) should be within the range of commercial tolerances ($\Delta E^*_{ab}=0$ to 2).

DETAILED DESCRIPTION OF THE INVENTION

Neutral blue zirconium-vanadium pigments are provided by the present invention having a zirconium host lattice which is also doped with phosphorus in addition to vanadium. These pigments are characterized in that they exhibit the color values $L^*=35$ to less than 50, $a^*=0$ to 4 and $b^*=-25$ to $-35$, measured in the CIE-L*a*b* color system according to DIN 5033, in 5% by weight staining in a transparent glaze. The L* value is usually between 40 and less than 50.

The composition of the preferred coloring substances of the present invention is represented by the formula:

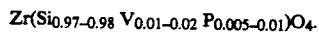

$$Zr(Si_{0.97-0.98}\ V_{0.01-0.02}\ P_{0.005-0.01})O_4.$$

The method for producing the neutral blue zirconium-vanadium pigments in accordance with the present invention is characterized in that a zirconium metal-free powder mixture consisting of essentially powdery zirconium dioxide, a source for silicon dioxide from the series of natural or synthetic silicas and zeolites (which may contain some $Al_2O_3$), at least one vanadium compound from the series of vanadium oxides and vanadates, at least one inorganic or organic phosphorus compound which can be converted during the method into a phosphate, and of at least one mineralizer based on fluoride, with the atomic ratio of zirconium to silicon to vanadium to phosphorus in the powder mixture being in the range of 1 to (0.95–1.10) to (0.05–0.20) to (0.005–0.03), is homogenized by means of a grinding in an intensive mill and is then annealed one to five hours at 700° C. to 900° C.

In the method of the present invention, the powder mixture to be annealed contains for the formation of the zirconium silicate host lattice powdery zirconium dioxide and a source for silicon dioxide consisting preferably essentially of $SiO_2$ (which may contain very limited amounts of impurities). It was surprising that as a result of the use of the cited raw materials, in conjunction with the vanadium and phosphorus compounds necessary for the doping, that neutral blue pigments can be produced with a greater color intensity and color saturation in a reliably reproducible form than when the thermally dissociated zirconium silicate according to GB 1,447,276 is used. The success is also surprising because of the teaching imparted on page 13 of publication No. 59, 2/83 of the Th. Goldschmidt company according to which phosphates in a powder mixture containing $ZrO_2$, $SiO_2$, $V_2O_5$ and a mineralizer prevent the insertion of the vanadium and allow only brown coloring substances to be produced.

If quartz powder or synthetically produced silica is used as the $SiO_2$ source, the zirconium dioxide to be used advantageously exhibits an average particle diameter ($d_{50}$ value) in a range of 2 to 9 μm, preferably 2 to 5 μm.

In order to dope the host lattice with phosphorus, various phosphorus compounds can be brought into the powder mixture. In principle, all phosphorus compounds are suitable which can react during the heating up and/or the annealing of the powder mixture to form a phosphate compound. Among the inorganic phosphorus compounds, the phosphorus-oxygen acids as well as their salts are particularly suitable, e.g., phosphoric acid, pyrophosphoric acid, and polyphosphoric acid as well as alkali- and ammonium salts of these acids. Organic phosphorus compounds exhibiting at least one P-O bond, e.g. phosphoric acid esters and phosphonic acids as well as their salts are also suitable. The phosphorus compounds present in solid or liquid form can be added as such to the powder mixture. It is advantageous, in order to achieve a good distribution, to add the phosphorus compound in liquid form, which can also include aqueous solutions.

Vanadium oxides, especially $V_2O_5$, and vanadates, especially alkali- and ammonium vanadates, can be added as the vanadium compound.

The presence of fluoride-based mineralizers is obligatorily necessary for the formation of coloring substances. In particular, fluorides of the alkali- and alkaline-earth metals as well as alkali silicofluorides are suitable. Sodium fluoride is preferred over lithium- and potassium fluoride. In addition to a fluoride-based mineralizer, other known mineralizers such as chlorides, hydroxides and carbonates of alkali metals can be additionally present in as far as this does not adversely affect the color location. The optimum amount of mineralizers is to be determined by the person skilled in the art in an orienting preliminary test. As a rule, the amount of mineralizers fluctuates in a range between 1 and 6% by weight, especially 3 to 5% by weight relative to the powder mixture. These are well known in the art.

The suggestion according to which the powder mixture consists "essentially" of the previously discussed components is to be understood in such a manner that in addition to the above-mentioned water in the aqueous solution of starting materials, other auxiliary processing agents such as silicon oils as auxiliary grinding agents can additionally be present in a small amount, generally below 5% by weight, preferably below 2% by weight relative to the powder mixture.

A feature essential to the invention within the framework of the production of the neutral blue zirconium-vanadium pigments is that the powder mixture is intensively ground prior to the annealing. High shearing forces take effect during the grinding process which brings about both a good homogenization and also a mechanical activation—a generation of crystal growth sites by means of friction, impact, pressure and shearing. Suitable intensive mills are e.g., ball mills, high-speed beater mills and oscillating or vibratory mills. The grinding time is essentially a function of the mill unit used, its operating intensity and of the degree of filling. The person skilled in the art will determine the optimum grinding time by means of preliminary orientation tests. In the case in which the grinding is performed in a ball mill or oscillating mill, good results are achieved with a grinding time in a range between 30 and 60 minutes.

The homogenized and mechanically activated powder mixture is annealed at an annealing temperature in a range of 700° to 900° C., preferably 750° to 850° C.; the annealing time is in a range between one and five, preferably between two and five hours. The annealing is carried out in customary annealing furnaces, e.g., electrochamber furnaces or tunnel furnaces suitable for the cited temperatures. The powder mixture is customarily in fireclay crucibles during the annealing; if desired, the powder mixture can also be supplied to the annealing in compacted form.

An essential advantage of the method of the present invention is a reliable reproducibility. The color intervals of successive production charges are below $\Delta E^*_{ab} = 1.5$. The pigments accessible with the method are neutral and exhibit the desired greater color intensity and greater color saturation.

REFERENCE EXAMPLE 1

Coloring substances using thermally dissociated zirconium silicate: The powder mixture to be annealed consisted of 90.7 g thermally dissociated zirconium silicate with the grain spectrum $d_{10}=0.8$ μm, $d_{50}=8.21$ μm, $d_{90}=20.44$ μm (TZS charge V308, 1/7/91; produced by means of the inductive melting of zirconium sand and quenching of the melt according to the method of DE patent application P 41 06 536.0 (corresponding to U.S. patent application Ser. No. 07/842,607, filed on Feb. 27, 1992, which is incorporated by reference):

| | |
|---|---|
| 5.0 g | Vanadium pentoxide ($V_2O_5$) |
| 3.1 g | Sodium fluoride |
| 1.2 g | Trisodium phosphate (anhydrous) |

The powder mixture was treated 20 minutes in a ball mill (degree of filling 60%, number of balls $4\phi = 3$ cm) and subsequently annealed in fireclay crucibles—heating range 100 K/h, annealing temperature 780° C. Dwell time 2 hours. The annealed product was ground wet in a known manner in a ball mill, at which time water-soluble components were dissolved out.

The L*a*b* values of the ground and dried pigment were determined in 5% by weight staining in a transparent glaze. Composition of the transparent glaze in % by weight: 50.64% $SiO_2$, 9.96% $B_2O_3$, 15.65% PbO, 11.22% $Al_2O_3$, 0.98% $Na_2O$, 3.17% $K_2O$, 8.05% CaO, 0.14% MgO, 0.05% ZnO and 0.14% $Fe_2O_3$. Stained test glaze was applied onto a test plate of biscuit ware porcelain and fired in 45 minutes at 1060° C. The L*a*b* values, measured according to DIN 5033, were
L* = 57.60
a* = −0.38
b* = −18.75.
The pigment exhibits a low coloring power and covers poorly.

REFERENCE EXAMPLE 2

Batch, preparation and annealing as in reference example 1 but using TZS charge V308, 3/7/91 with $d_{10}=0.7$ μm, $d_{50}=7.54$ μm and $d_{90}=18.97$ μm.
The annealed material obtained is pure white.

REFERENCE EXAMPLE 3

Batch, preparation and annealing as in reference example 1 but using TZS charge Ch. 2/11/91 with $d_{10}=0.5$ μm, $d_{50}=6.04$ μm and $d_{90}=15.75$ μm.
Color values of the staining:
L* = 71.87
a* = 2.57
b* = −5.49.

If reference example 2 is disregarded, in which no colored product is produced at all, the ΔE* value (DIN 6174) between 2 charges (examples 1 and 3) is, however, approximately 19. Such a color interval is intolerable.

REFERENCE EXAMPLE 4

The fact that a possible contamination of the mixture to be annealed with zirconium crystals actually results in greater L* values, negative a* and low b* values is rendered obvious by this reference example: Batch according to example 1 of the invention but with the addition of 2 g zirconium silicate. Color values:
L* = 55.56
a* = −1.69
b* = −23.41

EXAMPLE 1

A powder mixture was produced consisting of

| |
|---|
| 60.61 g zirconium dioxide with a $d_{50}$ value of 3.29 μm, $d_{10}$ value = 0.4 μm, $d_{90}$ value = 10.36 μm |
| 30.15 g quartz powder $d_{50}$ = 13.13 μm, $d_{10}$ = 1.82 μm, $d_{90}$ = 38.50 μm |
| 3.12 g sodium fluoride |
| 4.99 g vanadium pentoxide ($V_2O_5$) |
| 1.13 g trisodium phosphate (anhydrous). |

The powder mixture was treated in the same manner as in reference example 1 in a ball mill and subsequently annealed under the same conditions, posttreated and tested.
The pigment is characterized by the color values
L* = 49.08
a* = 3.7
b* = −27.05.

| |
|---|
| Analysis: 0.41% by weight V (relative to pigment) |
| 0.14% by weight P (relative to pigment) |

EXAMPLE 2

Example 1 was repeated, but with the sole difference that instead of trisodium phosphate, 1-hydroxyethane-1.1-diphosphonic acid was used. 1.2 ml of a 60% by weight solution of this acid in water (commercial supply form) were diluted with 10 ml water, the solution obtained added to the powder mixture of Zr-, Si- and V compounds and mineralizer and conjointly ground 20 minutes in a ball mill. The mixture obtained was annealed according to example 1 and then ground wet. The color values of the test staining are
L* = 46.93
a* = 1.21
b* = −27.21.

The pigments obtained in accordance with the examples of the present invention exhibit, when compared to those of the reference examples, a distinctly lower L* value (=greater intensity) and a more negative b* value (=more blue component). The L*a*b* values in the test reproductions in accordance with the present invention result in color intervals below $\Delta E^*_{ab}=2$.

Further variations and modifications of the foregoing will be apparent to those skilled in the art and such variations and modifications are attended to be encompassed by the claims that are appended hereto.

German Priority Application p 42 16 174.6 filed on May 15, 1992 is relied on and incorporated by reference. DE 41 06 535.2 (corresponding to U.S. patent application Ser. No. 07/842,610, filed on Feb. 27, 1992), and DE P 41 06 520.4 (corresponding to U.S. patent application Ser. No. 07/843,255), are all incorporated by reference.

What is claimed:

1. A neutral blue zirconium-vanadium pigment whose zirconium host lattice is also doped with phosphorus in addition to vanadium, said pigment represented by the formula $Zr(Si_{0.97-0.98} V_{0.01-0.02} P_{0.005-0.01})O_4$ and exhibiting the color values L*=35 to less than 50, a*=0 to +4 and b*=−25 to −35 in 5% by weight staining in a transparent glaze.

2. The pigment according to claim 1, wherein said L*=40 to less than 50.

3. A method of producing the neutral blue zirconium-vanadium pigment according to claim 1, comprising (a) homogenizing a zirconium metal-free powder mixture comprising powdery zirconium dioxide, a source of silicon dioxide, at least one vanadium compound, at least one inorganic or organic phosphorus compound which can be converted during the method into a phosphate, and at least one mineralizer based on fluoride, wherein the atomic ratio of zirconium:silicon:vanadium:phosphorus in said powder mixture is 1:0.95 to 1.10:0.05 to 0.20:0.005 to 0.03 and (b) annealing said powder mixture for 1 to 5 hours at 700° C. to 900° C.

4. The method according to claim 3, wherein said zirconium dioxide has an average particle diameter in the range of 2 to 9 μm.

5. The method according to claim 4, wherein said zirconium dioxide has an average particle diameter in the range of 2 to 5 μm.

6. The method according to claim 6, wherein said phosphorus compound is 1-hydroxyethane-1.1-diphosphonic acid or trisodium phosphate.

7. The method according to claim 3, wherein said phosphorus compound is a phosphorus-oxygen acid or its salt.

8. The method according to claim 7, wherein said phosphorus-oxygen acid is phosphoric acid, pyrophosphoric acid, or polyphosphoric acid.

9. The method according to claim 7, wherein said salt is an alkali or ammonium salt.

10. The method according to claim 3, wherein said phosphorus compound is liquid.

11. The method according to claim 3, wherein said phosphorus compound is an organic phosphorus compound containing at least one P-O bond.

12. The method according to claim 11, wherein said phosphorus compound is phosphoric acid ester or phosphonic acid or a salt thereof.

13. The method according to claim 3, wherein said mineralizer is a fluoride of an alkali- or alkaline-earth metal or an alkali silicofluoride.

14. The method according to claim 13, wherein said mineralizer is sodium fluoride.

15. The method according to claim 3, wherein said mineralizer is present in an amount corresponding to 1 to 6% of said mixture.

16. The method according to claim 15, wherein said mineralizer is present in an amount corresponding to 3 to 5% of said mixture.

17. The method according to claim 3, wherein said source of silicon dioxide is a natural or synthetic silica or zeolite.

18. The method according to claim 3, wherein said source of silicon dioxide is quartz powder or synthetically produced silica.

19. The method according to claim 3, wherein said source of silicon dioxide is silicon dioxide.

20. The method according to claim 3, wherein said vanadium compound is a vanadium oxide or a vanadate.

21. The method according to claim 20, wherein said vanadium oxide is $V_2O_5$.

22. The method according to claim 20, wherein said vanadate is an alkali or ammonium vanadate.

23. The method according to claim 3, wherein said annealing occurs for 2 to 5 hours.

24. The method according to claim 3, wherein said annealing occurs at a temperature from 750° C. to 850° C.

25. The method according to claim 3, where said homogenizing comprises grinding in a ball or oscillating mill with a running time of 30 to 60 minutes.

26. The method according to claim 3, wherein $\Delta E^*_{ab}$ ranges from 0 to 2.

27. The method according to claim 26, wherein $\Delta E^*_{ab}$ is less than 1.5.

28. The pigment according to claim 1 produced by a method comprising (a) homogenizing a zirconium metal-free powder mixture comprising powdery zirconium dioxide, a source of silicon dioxide, at least one vanadium compound, at least one inorganic or organic phosphorus compound which can be converted during the method into a phosphate, and at least one mineralizer based on fluoride, wherein the atomic ratio of zirconium:silicon:vanadium:phosphorus in said powder mixture is 1:0.95 to 1.10:0.05 to 0.20:0.005 to 0.03 and (b) annealing said powder mixture for 1 to 5 hours at 700° C. to 900° C.

* * * * *